United States Patent Office.

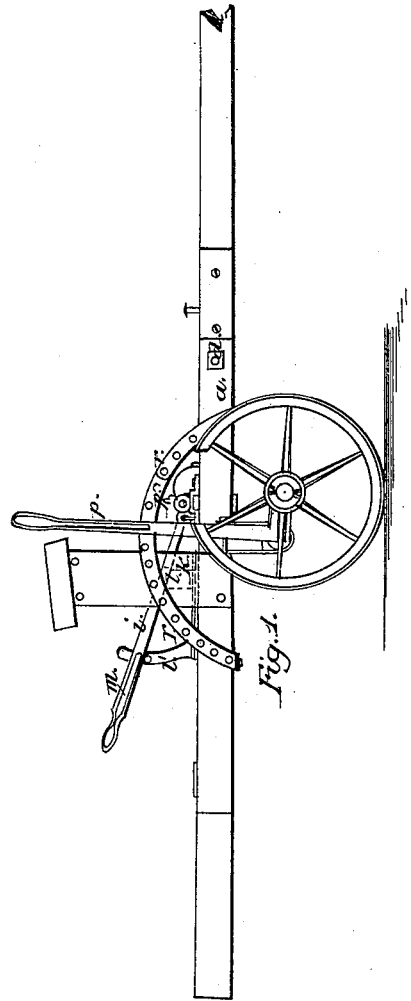
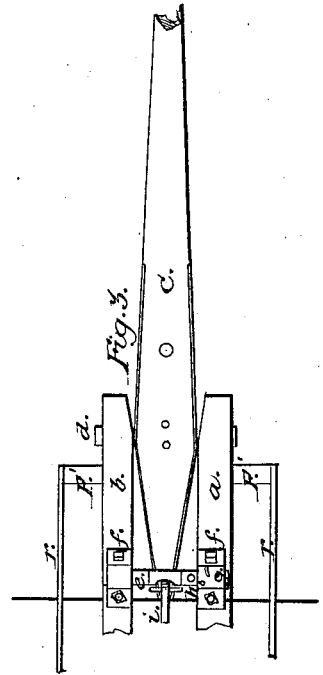
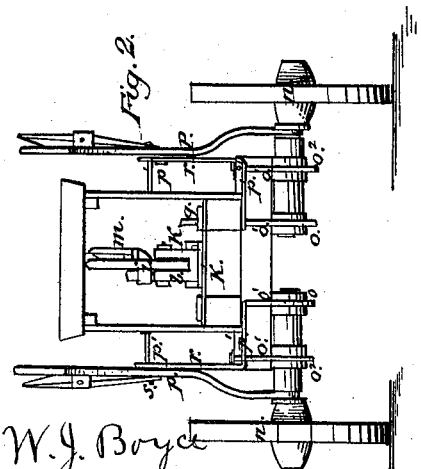

WORDEN J. BOYCE AND GEORGE W. HAINES, OF MAINE PRAIRIE, CALIFORNIA.

Letters Patent No. 96,875, dated November 16, 1869.

IMPROVEMENT IN GANG-PLOW.

The Schedule referred to in these Letters Patent and making part of the same.

*To all whom it may concern:*

Be it known that we, WORDEN J. BOYCE and GEORGE W. HAINES, of Maine Prairie, in the county of Solano, and State of California, have invented certain new and useful Improvements in Gang-Plows; and we do hereby declare that the following is a full and exact description of the same, reference being had to the accompanying drawings, and to the letters of reference marked thereon.

Our invention relates to a device for raising and lowering the frame to gang-plows, and thereby regulating the depth to be cut; also, to the graduating of the width of the furrow, so that when the soil is damp and heavy a less furrow may be taken than when it is dry; also, to a device for regulating the land and furrow-wheels, so that the plows will be held in a position parallel to the surface of the ground.

To accomplish this object we attach a lifting-bar to the inner end of the pole, with the fulcrum beneath the driver's seat, which works up and down on a curved bar, provided with holes, in which operates a pin, by means of a spring attached to the side of the bar.

The fulcrum also turns on a pivot, right or left, on a plate to which it is attached.

For a better description of our invention, reference is had to the accompanying drawings, of which—

Figure 1 is a side elevation.

Figure 2, a vertical section, taken back of the driver's seat.

Figure 3 is a plan of tongue and forward end of frame, showing the change-plate and its attachments.

$a$ and $b$ represent the frame, with ends bevelled to allow the pole to play.

The pole or tongue $c$ is held between the frame by a screw-bolt, $d$, and from this point of connection the pole is bevelled at each side in both directions, so that it will play right or left without obstruction, or coming in contact with the sides of the frame until the desired angle is attained. By this means the plows are turned to or from the land.

In order to hold the pole in position when these changes are made, we place a stirrup, $e$, upon the frame, which slides in ways or straps $ff$, one side of which is pierced to admit the pin $g$, that enters the regulating-holes $h\ h$, and has its seat in the frame.

In order to raise and lower the end of the draught-pole, and move it right or left, we link to the inner end of it a lifting-bar, $i$, whose fulcrum $k$ is beneath the driver's seat, and turns on a plate, $k'$.

This bar is caused to work up and down on a curved arm, $l$, which is perforated with holes, through which passes a pin that is attached to a spring-bar, $m$, so that by the raising or lowering of the bar the end of the pole is raised or depressed, and moved right or left on the pivot $l$, and thereby the plow-points are elevated or depressed, and turned in or out of the ground.

The axles of the driving-wheels $n\ n$ are each independent, and turn in half-oval journals $o\ o$, which are held to the axle-bed by clips $o^1\ o^1$.

The outer boxes $o^2\ o^2$ are divided for connection and adjustment with the axle, which is turned to form bearings between shoulders.

From the cranks extend arms or levers $p\ p$, which move on circular perforated racks or plates $r\ r$, and are held by straps $p'\ p'$.

The ends of the levers are provided with a spring-bar and pin, $s$, which passes through the lever and enters the holes in the semicircular plate.

These levers are within easy reach of the driver, and by their operation the wheels can be raised or lowered, to impart to the plows a greater or less depth, and hold them in a position parallel to the surface of the ground which is being turned.

Having thus described our invention, we are well aware that crank-axles on gang-plows are known and in use; also, that circular racks or semicircular perforated plates are devices well known for regulating the driving-wheels; consequently,

What we claim as new in our device, and desire to secure by Letters Patent, is—

1. The machine described, consisting essentially of the frame $a\ b$, tongue $c$, adjusting-devices $e\ g\ i\ k$, wheels $n$, and lever $p$, the whole being combined and arranged for the purpose set forth.

2. The sliding stirrup $e$, moving in straps or ways $ff$ at the top of the frame, and held in place by a pin, $g$, or their equivalents, substantially as set forth.

3. The lifting-bar $i$, with its movable fulcrum $k$, on the plate $k'$, so that by its link-connection with the end of the tongue, the draught-pole can be thrown to the right or left, or the end raised and lowered, substantially as set forth.

In witness whereof, we have hereunto set our hands and seals.

WORDEN J. BOYCE. [L. S.]
GEO. W. HAINES. [L. S.]

Witnesses:
JNO. H. CUSHING,
PATRICK BYRNE.